No. 851,326. PATENTED APR. 23, 1907.
J. STUART.
WHEEL.
APPLICATION FILED OCT. 5, 1906.
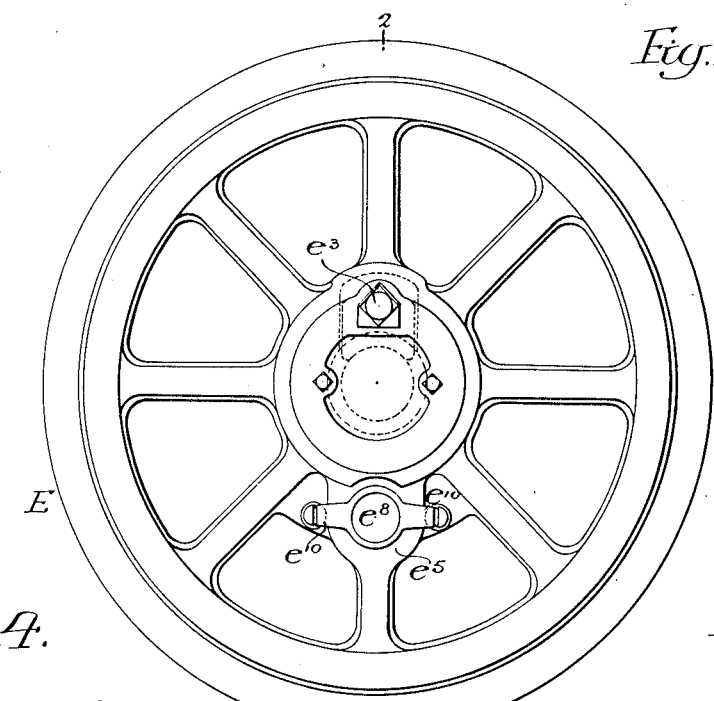
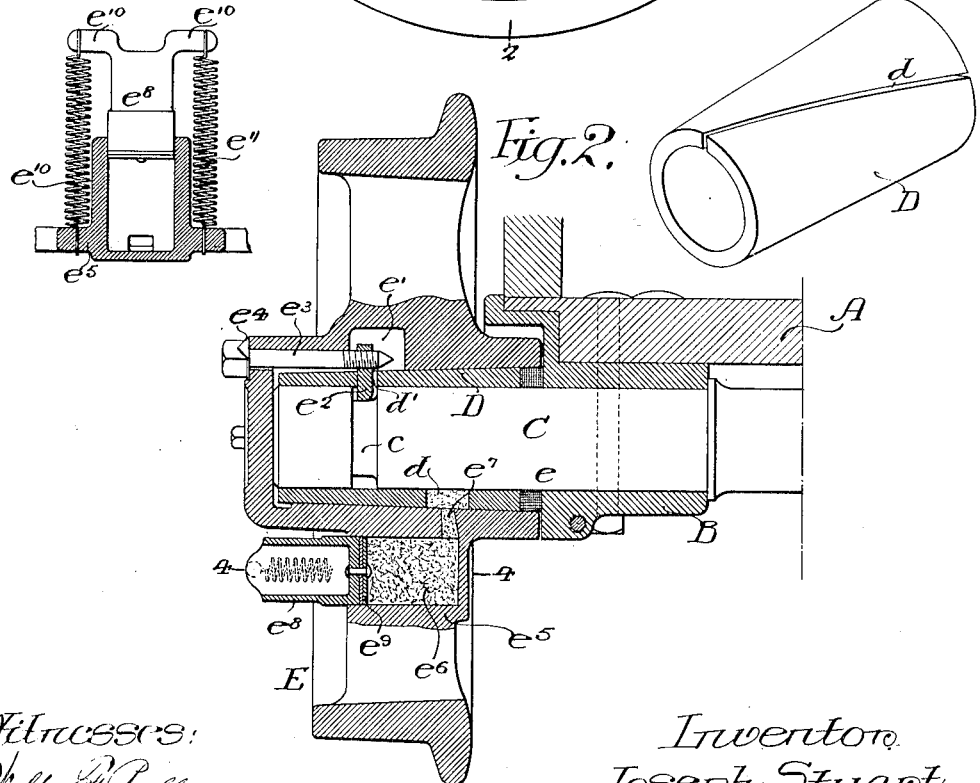
Witnesses:
Inventor,
Joseph Stuart
by his Attorneys,
Howson & Howson

UNITED STATES PATENT OFFICE.

JOSEPH STUART, OF WILMINGTON, DELAWARE.

WHEEL.

No. 851,326.　　　Specification of Letters Patent.　　　Patented April 23, 1907.

Application filed October 5, 1906. Serial No. 337,589.

*To all whom it may concern:*

Be it known that I, JOSEPH STUART, a citizen of the United States, residing in Wilmington, Delaware, have invented certain Improvements in Wheels, of which the following is a specification.

One object of my invention is to provide means for lubricating a loose running wheel, of the type commonly used on mine cars, in such manner that a supply of lubricant shall be forced to the points where it is needed, regardless of the speed at which the wheel is turned.

I further desire to provide a wheel with a novel form of removable bushing, which bushing shall itself be of chilled metal and split in order not only to facilitate its manufacture, but to assist in the distribution of the lubricant to the shaft axle.

I further desire to provide novel means for retaining a loose running wheel, either with or without a removable bushing, upon its supporting axle or shaft.

Another object of the invention is to so arrange the various parts of the device that it shall be practically impossible for grit or foreign matter to obtain access to the bearing surfaces of the axle and bushing.

These objects and other advantageous ends I secure as hereafter set forth, reference being had to the accompanying drawing, in which:

Figure 1, is a side elevation of a wheel equipped with my invention; Fig. 2, is a vertical section on the line 2—2, Fig. 1, illustrating the detail construction and arrangement of my invention; Fig. 3, is a perspective view of the bushing usually employed as part of my invention; and Fig. 4, is a section on the line 4—4, Fig. 2, illustrating the detail construction of the grease feeding device.

In the above drawing, A represents a portion of the body of a car provided with any desired form of pedestal B in which is carried an axle or shaft C. Said axle has near its end an annular groove $c$ and fitting upon it is an externally tapered bushing D, preferably of iron chilled both internally and externally.

In order that it may be commercially possible to manufacture a bushing of this construction, I make it in split form as shown in Fig. 3, that is, I preferably cast it with a slot extending in a general longitudinal line in its side. Said slot is so placed as to lie in any line not parallel with the axis of the bushing; it being preferably made spiral or extended in some other line at an angle to the bushing axis.

The hub of the wheel E is internally tapered to receive the bushing D and is closed on the outside face; there being a ring $e$ of fibrous packing interposed in the space defined by the hub, the axle and the adjacent end faces of the bushing D and of the pedestal B. The hub is cored at $e'$ to form a recess for the reception of a key $e^2$, which key is designed to pass through a transverse slot $d'$ in the bushing D and enter the annular groove $c$ of the axle C.

The recess $e'$ in the hub of the wheel is made of such depth that it will let the key drop back into it for a distance sufficient to permit the axle to be withdrawn from the bushing D and said key is held so as to project through the slot of said bushing and enter the groove $c$, by means of a bolt $e^3$ extending into the hub from its outer face and held from moving by a washer $e^4$.

In order to lubricate the axle, I provide an enlargement of the hub or of the spokes of the wheel, as indicated at $e^5$, forming in this a cylinder $e^6$ which extends in a line substantially parallel to the axis of the wheel and communicates through a passage $e^7$ with the slot $d$ of the bushing D. In said cylinder, I place a plunger $e^8$, provided with any suitable form of washers $e^9$ on its inner face to serve as packing to prevent the escape of grease confined by it within the cylinder $e^6$. This plunger is provided at its outer end with two laterally extending arms $e^{10}$ and between these and the body of the wheel I provide a pair of tension springs $e^{11}$, whereby the plunger is continually pressed into the cylinder.

In order to assemble the various parts of the device the bushing D is inserted in the tapered bore of the hub and the key $e^2$ is dropped through the transverse slot $d'$ of said bushing, which, it will be understood, has been brought into a position 180° from that shown in Fig. 1, so that said key will enter the recess $e'$ of the hub. With the wheel in this position, the bushing is driven home and inasmuch as said recess $e'$ is of sufficient depth to allow the key to enter it far enough to prevent its projecting into the bushing, the axle may now be inserted and the wheel turned through one-half a revolution. This causes the key $e^2$ to drop into the annular groove $c$ of said axle, when the bolt $e^3$ may be inserted and screwed up, thus securing not only the wheel to the axle but maintaining the bushing, axle, and wheel from independent movement in the line of the axle and also preventing relative movement of the wheel and the bushing. Under these conditions, the slot $d$ of the bushing D crosses the channel $e^7$ from the cylinder $e^6$, so that under operating conditions the pressure of the plunger upon the grease in said cylinder, under the action of the springs $e^{11}$, causes said grease to be forced into the groove or slot $d$ and permits it to thoroughly and continuously lubricate the axle within the bushing.

It may be noted that the groove $d$ of the bushing D serves a two-fold purpose, since it not only permits the casting and chilling of the bushing where this has hitherto been found impractical owing to the cracking which invariably occurred when the bushing cooled, but it also acts as a distributer of lubricant to the entire length of the axle bearing. Said groove also obviates the difficulty hitherto invariably encountered when it was attempted to remove the bushing from the mandrel on which it was cast.

It will be understood that it is not advisable to form the groove $d$ parallel to the general line of the bushing or to the line of the axle, since under these circumstances it would cause cutting of the latter. I, therefore, preferably give it a general spiral form, though it may be given any other desirable form without departing from my invention.

I claim:

1. The combination of an axle, a bushing thereon, and a wheel fitting said bushing, said bushing being loose in the wheel and removable therefrom, with a key placed to retain the wheel and the bushing on said axle, substantially as described.

2. The combination of an axle having an annular groove, a bushing on said axle having a slot, and a wheel on the bushing, said bushing being loose in the wheel and removable therefrom, with a key fitting in a recess in the wheel and passing through the slot in the bushing into the groove of the axle, substantially as described.

3. The combination of an axle having an annular groove, a bushing on the axle having a slot, a wheel having a recess in its hub, said bushing being loose in the wheel and removable therefrom, with a radially movable key extending into the recess of the wheel and through the slot of the bushing into the groove of the axle, substantially as described.

4. The combination of an axle having an annular groove, a bushing on the axle having a slot, a wheel having a recess in its hub, and a radially movable key extending into the recess of the wheel and through the slot of the bushing into the groove of the axle, the recess in the wheel being of a sufficient depth to permit movement into it of said key, and a bolt for holding the key so that it projects into the groove of the axle, substantially as described.

5. The combination with an axle, of a split bushing thereon, and a wheel on the bushing, with means for maintaining the wheel and the bushing in position on the axle while preventing relative movement of said wheel and bushing, substantially as described.

6. The combination of a wheel, an internally and externally chilled and split bushing fitted to the hub thereof, with means for preventing rotation of the bushing relatively to the wheel, an axle fitted to the bushing, with means for maintaining the wheel and bushing in operative position on the axle, substantially as described.

7. The combination of a wheel having a tapered hollow in its hub, an internally tapered bushing fitted to said hollow, the said bushing being split and chilled both externally and internally, an axle fitted to the bushing, with a key for maintaining the axle, bushing and wheel in the proper relative positions to compel said wheel and bushing to turn as a unit on the axle, substantially as described.

8. The combination of a wheel, an internally and externally chilled bushing fitted to the hub thereof, said bushing being split in a line extending in a direction other than parallel to its axis, an axle fitting said bushing, with means for maintaining the bushing and wheel in proper relative positions, substantially as described.

In testimony whereof, I have signed my name to this specification, in the presence of two subscribing witnesses.

JOSEPH STUART.

Witnesses:
HARRY C. TAZEWELL,
HARRY B. CARTER.